United States Patent
Dudek et al.

(10) Patent No.: US 9,493,310 B2
(45) Date of Patent: Nov. 15, 2016

(54) SYNC MOTOR WITH REDUCED NOISE LEVEL

(71) Applicant: INTERROLL Holding AG, Sant'Antonino (CH)

(72) Inventors: Siegmund Dudek, Heinsberg (DE); Thomas Wolters, Schwalmtal (DE)

(73) Assignee: INTERROLL HOLDING AG, Sant'Antonino (CH)

( * ) Notice: Subject to any disclaimer, the term of this patent is extended or adjusted under 35 U.S.C. 154(b) by 0 days.

(21) Appl. No.: 14/609,786

(22) Filed: Jan. 30, 2015

(65) Prior Publication Data
US 2015/0210479 A1 Jul. 30, 2015

(30) Foreign Application Priority Data

Jan. 30, 2014 (DE) ............... 20 2014 000 757 U (51) Int. Cl.
| | |
|---|---|
| *B65G 13/06* | (2006.01) |
| *B65G 23/08* | (2006.01) |
| *B65G 39/02* | (2006.01) |

(52) U.S. Cl.
CPC ............... *B65G 23/08* (2013.01); *B65G 39/02* (2013.01)

(58) Field of Classification Search
CPC .................. B65G 23/08; B65G 39/02; B65G 13/02–13/075
(Continued)

(56) References Cited

U.S. PATENT DOCUMENTS

| | | | | |
|---|---|---|---|---|
| 1,868,825 A | * | 7/1932 | Grosjean ............... | B21B 39/008 198/788 |
| 5,289,913 A | * | 3/1994 | Fujio .................... | B65G 47/261 198/780 |

(Continued)

FOREIGN PATENT DOCUMENTS

| | | |
|---|---|---|
| DE | 19704394 A1 | 3/1998 |
| DE | 10146138 A1 | 5/2002 |

(Continued)

OTHER PUBLICATIONS

Extended European Search Report mailed Jun. 12, 2015, from European Application No. 14193334.1 (with machine translation), 19 pages.

(Continued)

*Primary Examiner* — William R Harp
(74) *Attorney, Agent, or Firm* — Kilpatrick Townsend & Stockton LLP (57) ABSTRACT

Disclosed is a conveyor having an axle extending along a longitudinal axis, a drum body mounted rotatably on the axle, a drive unit having a motor which is disposed inside the drum body and which includes a rotor and a stator, wherein either one of the rotor or the stator is coupled torque-resistantly with a drive output shaft which is mounted rotatably about a drive axle and the other one of said rotor and stator is a torque support and is coupled torque-resistantly with the axle, and a connector member which is disposed inside the drum body and torque-resistantly coupled with the drum body and the drive output shaft of the drive motor, wherein a first flexible elastic coupling is disposed between the torque support and the axle, and that a second flexible elastic coupling is disposed between the drive output shaft and the drum body.

15 Claims, 3 Drawing Sheets

(58) Field of Classification Search
USPC .................................. 198/780–791, 832–835
See application file for complete search history.

(56) References Cited

U.S. PATENT DOCUMENTS

| | | | |
|---|---|---|---|
| 6,837,364 B2* | 1/2005 | Kanaris .................. | B65G 23/08 198/782 |
| 7,207,433 B2* | 4/2007 | Schaefer ................ | B65G 23/08 198/788 |
| 8,381,901 B2* | 2/2013 | Yamamoto ............. | B65G 13/02 198/788 |
| 8,789,686 B2* | 7/2014 | Lindemann ............ | B65G 23/08 198/788 |
| 2013/0334012 A1* | 12/2013 | Lindemann ............ | B65G 23/08 198/789 |

FOREIGN PATENT DOCUMENTS

| DE | 10 2006 049327 A1 | 4/2008 |
|---|---|---|
| DE | 202012005380 U1 | 9/2013 |
| WO | 2004/045995 A1 | 6/2004 |

OTHER PUBLICATIONS

Search Report mailed Aug. 11, 2014, from German Application No. 202014000757.8.

* cited by examiner

Fig. 3

SYNC MOTOR WITH REDUCED NOISE LEVEL

CROSS-REFERENCES TO RELATED APPLICATIONS

This application claims priority to German Patent Application No. 202014000757.8, filed Jan. 30, 2014, the disclosure of which is incorporated by reference herein.

BACKGROUND OF THE INVENTION

The invention relates to a conveyor comprising an axle extending along a longitudinal axis, a drum body mounted rotatably about the longitudinal axis on the axle, a drive unit comprising an electrical drive motor which is disposed inside the drum body and which includes a rotor and a stator, wherein either one of the rotor or the stator is coupled torque-resistantly with a drive output shaft which is mounted rotatably about a drive axle and the other one of said rotor and stator is a torque support and is coupled torque-resistantly with the axle, and a connector member which is disposed inside the drum body and torque-resistantly coupled with the drum body and the drive output shaft of the drive motor.

Conveyors of this kind are used for different purposes and in different designs. A conveyor according to the invention may be a drum motor, for example, or a roller drive. Drum motors are deployed, for example, in such a way that they are mounted in a frame by means of the axle, which is then attached stationarily in relation to the frame and torque-resistantly to the frame. The drum body rotatably mounted on the axle is driven by means of the drive unit inside the drum body and made to rotate. The drive unit is supported by the axle and is connected with the drum body on the driven side. The drum motor can be used to drive other devices by means of a belt drive or the like, for example a conveyor line consisting of a plurality of conveyor rollers. The drum motor can also be used directly as a conveyor element in a conveyor line and can carry the conveyed item and convey it by rotation of the drum body. Another use is to dispose the drum motor as a drive element at the end of a conveyor belt system and to guide a conveyor belt which is partly wrapped around the drum body and to make it move by rotation of the drum body.

Drum motors with different driving power are known from the prior art. The driving power ranges from about 10 W to 6 KW and can transmit a torque of up to 1000 Nm via the drum body. Due to their particular construction, drum motors are characterized by the specific problem of heat being difficult to dissipate from the drive means, which is disposed inside the drum body for compact construction. For some drum motors with high power ratings, filling the drum body with oil is therefore an established technique in the prior art for ensuring that the drum motor remains thermally stable even under heavy loads. As a basic principle, however, it is possible to dispense with filling the drum body with oil even when such components are used, due to higher levels of efficiency.

In contrast to drum motors, roller drives are generally equipped with a drum body of smaller diameter, referred to as a roller body or pipe, and typically have a power rating of less than 100 W, typically in the range between 10 and 40 W. Such roller drives are used to carry and convey items in roller conveyor lines. Roller conveyors can be combined with a plurality of idle rollers arranged in parallel, which are driven by the motor-driven or similarly driven conveyor roller via a belt drive or chain drive, as the case may be. In curved roller conveyors, the rollers are arranged with their axes at an angle to each other.

Drum motor and roller conveyor drives are frequently used in environments in which they are used for conveying articles in production facilities, in a logistics distribution center, or in a warehouse. In such environments, it is generally desirable that as little noise is produced by the conveyor systems installed and operated there, so as not to disturb people who work in the area near such production or logistics facilities.

To that end, it is known from the prior art to equip drum motors and motor-driven conveyor rollers with a drive unit that partly makes use of plastic elements for force transmission, in particular in the drive section of the drive output shaft and in any gear mechanism that may be disposed there. For example, it is known from the prior art that the noise produced by gear transmissions can be reduced by using plastic gear wheels on one or both sides for the various gear ratios. The disadvantage of such a construction, however, is that the transmittable power is reduced because of the lower durability of the plastic gear wheels in the drive train, and that the service life is shorter.

Mounting drum motors and motor-driven conveyor rollers in encapsulated sections in order to reduce noise emissions from conveyor lines containing such drum motors or motor-driven conveyor rollers is also known from the prior art. Such an encapsulated conveyor line is practicable for a number of applications, but when the conveyed items must be accessible to people, such an encapsulated conveyor line can only be achieved in a very impracticable manner such that access to the items is possible. Conveyor lines with an encapsulated design are also a constructionally complex and cost-intensive solution.

BRIEF SUMMARY OF THE INVENTION

The object of the invention is to provide a conveyor in which the noise generated during operation is reduced in comparison with the prior art.

According to the invention, this object is achieved by a conveyor of the kind initially described, in which a first flexible elastic coupling is disposed between the torque support and the axle, and by disposing a second flexible elastic coupling between the drive output shaft and the drum body.

The conveyor according to the invention is based on the realization that, although noise can be reduced by modifying materials and applying complex production techniques to the drive unit and the bearing assemblies of drum motors and motor-driven conveyor rollers, such noise reduction does not result in any cost-efficient noise reduction, because the production cost and effort and the functional compromises associated with such fine mechanical processing and material modifications increase the production cost and the operating expense of the conveyor.

One cause of noise has been identified as a load that arises within the conveyor and which acts on the drive unit, with the result that the drive unit cannot be operated with the theoretically ideal workload and geometry that should result from the load imposed on the conveyor. The invention is based instead on the realization that the drive unit is exposed to forces that increase the level of noise produced, on the one hand due to manufacturing tolerances, on the other hand due to loads that arise when operating the conveyor. These forces may be the result of an angular offset due to the position in which the drive unit is mounted inside the drum body. More particularly, however, a force acting tangentially or radially on one side of the drum body, as may be produced when a drum motor is deployed in a conveyor belt system and the conveyor belt is under high tension, for example, causes an increase in angular offset and in the noise produced by the conveyor.

This realization is applied, according to the invention, in an improved conveyor in which the drive unit is decoupled from such transverse forces by connecting it on both sides, inside the drum body, using flexible elastic couplings. Due to this decoupling by means of the two flexible elastic couplings, it is not possible for any lateral forces to be exerted on the drive unit due to an angular offset that results from manufacturing tolerances, or that is caused by tangential or radial forces acting on one side only. The lateral forces acting on the drive unit are substantially reduced by such decoupling. In the conveyor according to the invention, the drive unit can therefore operate free of lateral forces, and therefore particularly quietly, decoupled from any angular offset, or with only slight lateral forces being exerted.

According to the invention, a flexible elastic coupling is understood to be a component for transmitting a torque about an axle, said component being substantially torsionally rigid against torque transmission about the axle, but having a low stiffness against bending moments acting in directions that are transversal to that axle, meaning the coupling is flexible or elastic, for example. One example of such a flexible elastic coupling is a rubber-metal element, an elastomer-metal element or a plate clutch, another is a classical cardan joint or other designs having such a torsional stiffness about a rotational axis and lateral bending flexibility relative to the rotational axis.

According to the invention, an angular offset is understood to be an angular deviation arising between two axes or sections of an axis. Although a conveyor having the construction according to the invention is typically designed in such a way that the drive axle and the longitudinal axis are coaxial or parallel with each other, with the longitudinal axis of the drum body designed to run centrally at both ends through the axle or axle members on which the drum body is rotatably mounted, deviations from such a coaxial or parallel orientation may results in practice when the conveyor is exposed to heavy workloads. For example, when strong radial forces act on the drum body, the axle about which the drum body is rotatably mounted at one end can move out of its coaxial orientation relative to the axle about which the drum body is mounted at the opposite end, thus giving rise to an angle. This angle may result from bending of a continuous end-to-end axle, or more particularly when using a divided axle with two stub shafts, and from bending of the drum body, or from bending inside the axle bearings. As a result of such bending, the drive axle may move out of its coaxial or parallel position relative to the longitudinal axis and form an angle to the longitudinal axis. These angular deviations that arise in practice give rise to unfavorable loads on the drive unit and on the bearings of the drum body and in addition to the associated wear and tear also produce operating noise that increases the level of noise emissions from the conveyor.

By using the flexible elastic couplings according to the invention, the angular offsets are not prevented, but the resultant loads imposed by such an angular offset on the drive unit and the bearings are significantly reduced. The result is that both the wear and tear produced by the angular offset as well as the noise caused by the latter are significantly reduced.

Another effect that has been found, particularly when couplings are used which include rubber elements such as elastomer-metal elements, is that the drive unit is acoustically decoupled from the axle, as a result of which the transmission of structure-borne noise via the drum, the drum bearings and the axles in a frame in which the conveyor is mounted, is significantly reduced, and neither the drum body nor the frame can function as a resonating body for the noises from the drive unit.

According to the invention, a coupling disposed between two components is understood to be a coupling that couples said two components with each other to transmit a torque. To achieve that, the coupling may also be disposed spatially between the two components, or the coupling may be disposed in front of or behind the two components for the respective torque transmission, such that one of the two components is disposed between the other component and the coupling. Constructions in which the components engage each other can also be designed to translate the functional position of the coupling between the two components into a spatial arrangement.

According to a first preferred embodiment, the second flexible elastic coupling is adapted to perform an elastic angular offset about a transverse axis perpendicular to the drive axle when impinged with a torque (for example a torque of 100 Nm), about the transverse axis, said angular offset being greater than an angular offset about the drive axle when the same torque is applied to the drive axle.

With a flexible elastic coupling having these characteristics, the rotation necessary for driving the drum body and the torque can be guided in a rigid transmission path from the drive unit to the drum body, whereas angular deviations between the drive axle, the longitudinal axis or between the longitudinal axes at the two ends can be offset by a small bending resistance of the coupling, without any bending forces being guided into the drive unit or the bearing units for rotatably mounting the drum body.

It is also preferred when the second flexible elastic coupling is adapted to perform an elastic angular offset about a transverse axis perpendicular to the drive axle when impinged with a torque of 100 Nm about the transverse axis, said angular offset being greater than an angular offset about the drive axle when the same torque is applied to the drive axle. This development of the invention applies the same preferred design to the second flexible elastic coupling. It should be understood in this regard that both the first and the second elastic coupling are preferably adapted accordingly, and that it is also preferable that both couplings have the same angular offset about the transverse axis and about the drive axle when a torque is applied. This has the advantage of producing a substantially symmetrical load and deformation under load.

According to another preferred embodiment, the drive unit includes a gear mechanism which has a gear output shaft, the drive motor has a motor output shaft coupled with a gear input shaft, and the gear output shaft is coupled with the connector member. By providing a gear mechanism as a component of the drive unit, the motor speed can be stepped down and a high torque transmitted from the drive motor onto the drum body, as is preferred in many applications of conveyors. It should be understood, as a basic principle, that the drive unit may also comprise just one drive motor, the motor output shaft of which acts directly on the drum body so that the rotor speed of the drive motor and the rotor speed of the drum body are the same.

It is preferred in that regard that the second flexible elastic coupling be coupled between the gear output shaft and the connector member. This configuration allows the drive unit, consisting of the drive motor and the gear mechanism, to be embodied as a rigid, integral assembly, and to decouple it by means of a flexible elastic coupling on the output side, that is to say, at the gear output shaft, in such a way that no bending forces can be guided into the drive unit by forces acting radially on that side, or that any such forces are significantly reduced.

In other, alternative, embodiments, the second flexible elastic coupling can be advantageously coupled between the motor output shaft and the gear input shaft. In this embodiment, an angular deviation between the motor output shaft and the gear input shaft is permitted and force-decoupled by the flexible elastic coupling, as a result of which any deformations and angular deviations acting on the drive unit are also offset within the drive unit by respective decoupling via the flexible elastic coupling, thus preventing or significantly reducing any transmission of force onto the gear mechanism or the drive unit.

It is then further preferred in this regard that the gear mechanism has a gear casing in which the gear input shaft is rotatably mounted, and that the gear casing is connected torque-resistantly by means of a third flexible elastic coupling with a motor housing of the drive motor. With this configuration, the gearbox casing which is connected with the motor housing of the drive motor in typical applications is likewise connected via an additional flexible elastic coupling such that the gear mechanism and the drive motor are completely decoupled from each other by the second and the third flexible elastic coupling in the region of the shaft and the torque support provided by the housing.

According to another preferred embodiment, the first, second and/or third flexible elastic coupling has a rubber element for transmitting torque about the drive axle. Providing the flexible elastic coupling with a rubber element can produce effective decoupling of angular offsets by elastic deformation of the rubber element, while also achieving acoustic decoupling of the structure-borne noise of the two components connected with each other via the coupling, due to the damping effect of the rubber element.

More particularly, the coupling may be designed in such a way that the rubber element is coupled form-fittingly for torque transmission with a coupling input support and a coupling output support. By integrating the rubber element form-fittingly inside the coupling, the torque can be transmitted via corresponding planar surfaces preferably extending radially and perpendicularly to the circumferential direction, whereas any angular deviation is offset by the coupling, free of forces or with a reduction of forces, by elastic deformation of the elastomer-metal element or rubber element or by a translational movement between the force-transmitting surfaces. In other configurations, material-fitting contact can be provided between the rubber element and the coupling support on the input or output side.

It is further preferred that the rubber element has a plurality of sectors distributed over a circumference of the coupling, said sectors each having a first contact surface preferably oriented perpendicularly to the circumferential direction and a second contact surface preferably oriented perpendicularly to the circumferential direction, and that the first contact surface abuts against a corresponding surface of the coupling input support and the second contact surface abuts against a corresponding surface of the coupling output support. The elastomer-metal element or rubber element may have a plurality of sectors shaped like slices of cake, each bounded on the input side by the coupling input support and on the output side by the coupling output support, such that the torque can be transmitted by means of surfaces on the rubber element extending radially and perpendicularly to the drive axle, and respectively by the coupling input and coupling output supports. Alternatively, these contact surfaces may also be slanted, or arranged in some other form, wherein at least one component of the surface normal must point in the circumferential direction so that the torque can be transmitted.

It is particularly preferred in this connection that the sectors of the rubber element are joined together to form an integral rubber element. Embodying the rubber element as an integral component facilitates production and installation of the rubber element itself, and allows prevention of any errors with regard to positioning the rubber element.

It is still further preferred when the axle includes a first stub shaft which projects from the drum body at a first end face of the drum body and on which the drum body is mounted rotatably about a first portion of the longitudinal axis, and includes a second stub shaft which projects from the drum body at an opposite end face of the drum body from the first end face and on which the drum body is mounted rotatably about a second portion of the longitudinal axis, and that the first flexible elastic coupling is disposed between the torque support and the first stub shaft and that the second flexible elastic coupling is disposed between the drive output shaft and the drum body. By configuring the conveyor with two stub shafts, a powerful motor can be disposed inside the drum body, supported at the one end by an actuator or stator on the one stub shaft, and connected accordingly with the drum body at the other end by an actuator or stator via a connector member. When designing the bearings for the drum body, the latter can be rotatably mounted on sliding or roller bearings at the ends, on the two stub shafts, in what in practice is an ideal manner for the loads imposed. In this configuration, in particular, the variant with a flexible elastic first and second coupling is particularly advantageous in that angular deviations which occur in practice between the two stub shafts or portions of the longitudinal axis, due to manufacturing tolerances and loads imposed, can be offset in such a way that there is no resultant increase in the level of noise emissions from the conveyor.

It is particularly preferred in this connection when the first flexible elastic coupling is spatially arranged in the region between the drive unit and the first stub shaft, and the second flexible elastic coupling is spatially arranged in the region between the drive unit and the second stub shaft. This arrangement of the stub shafts decouples the drive unit in an ideal manner from any loads and allows the drive shaft to rotate and the torque to be transmitted via the drive shaft to the drum body without any transversal forces being involved.

It is still further preferred that the first and the second portions of the longitudinal axis run coaxially with each other when there is no radial load on the drum body and run at an obtuse angle to each other when the drum body is under a radial load, and that the angular offset formed by the obtuse angle is taken up by the first and second flexible elastic coupling such that the bending moment exerted by the radial load on the drive unit is less than the bending moment exerted by the radial load on the drum body. The form of construction advantageously exploits the possibilities of the first and second flexible elastic coupling, in that an angular offset is permitted in the form of the obtuse angle, and in that the components are dimensioned for the maximum permitted loads for the conveyor while taking this permitted angular deviation into consideration.

Another aspect of the invention, finally, is a conveyor which also includes a second drum body mounted on the second axle, wherein the second drum body is spaced apart from the first drum body, and preferably spaced apart from and parallel to the first drum body. Other components of this arrangement are a continuous conveyor belt which is tensioned between the first and the second drum body, and a tensioning device for tensioning the continuous conveyor belt. The tensioning device, which may be provided, for example, in the form of an eccentric tensioning device for the first or the second axle, or in the form of attachment in an elongate hole, or also in the form of a selection of fixing holes for the first or second axle, allows the distance between the longitudinal axis of the first drum body and the longitudinal axis of the second drum body to be changed in such a way that the continuous conveyor belt wrapped around the two drum bodies is tensioned as a result. Such tension produces reliable frictional engagement between the drum body and the continuous conveyor belt, and an item can be carried and conveyed on the conveyor belt surface by this arrangement. Due to the tensioning device, however, this arrangement is subject to strong radial forces in the region of the two drum bodies. These radial forces act on the surface of the drum body and produce a bending force that acts approximately at the middle of the drum body to produce bending of the longitudinal axis of the drum body. Due to the conveyor arrangement according to the invention, this bending is decoupled efficiently from the drive unit, thus resulting in the noise emissions of the conveyor not increasing in this arrangement.

BRIEF DESCRIPTION OF THE DRAWINGS

Preferred embodiments of the invention shall now be described with reference to the attached Figures, in which.

DETAILED DESCRIPTION OF THE INVENTION

Figure 1:
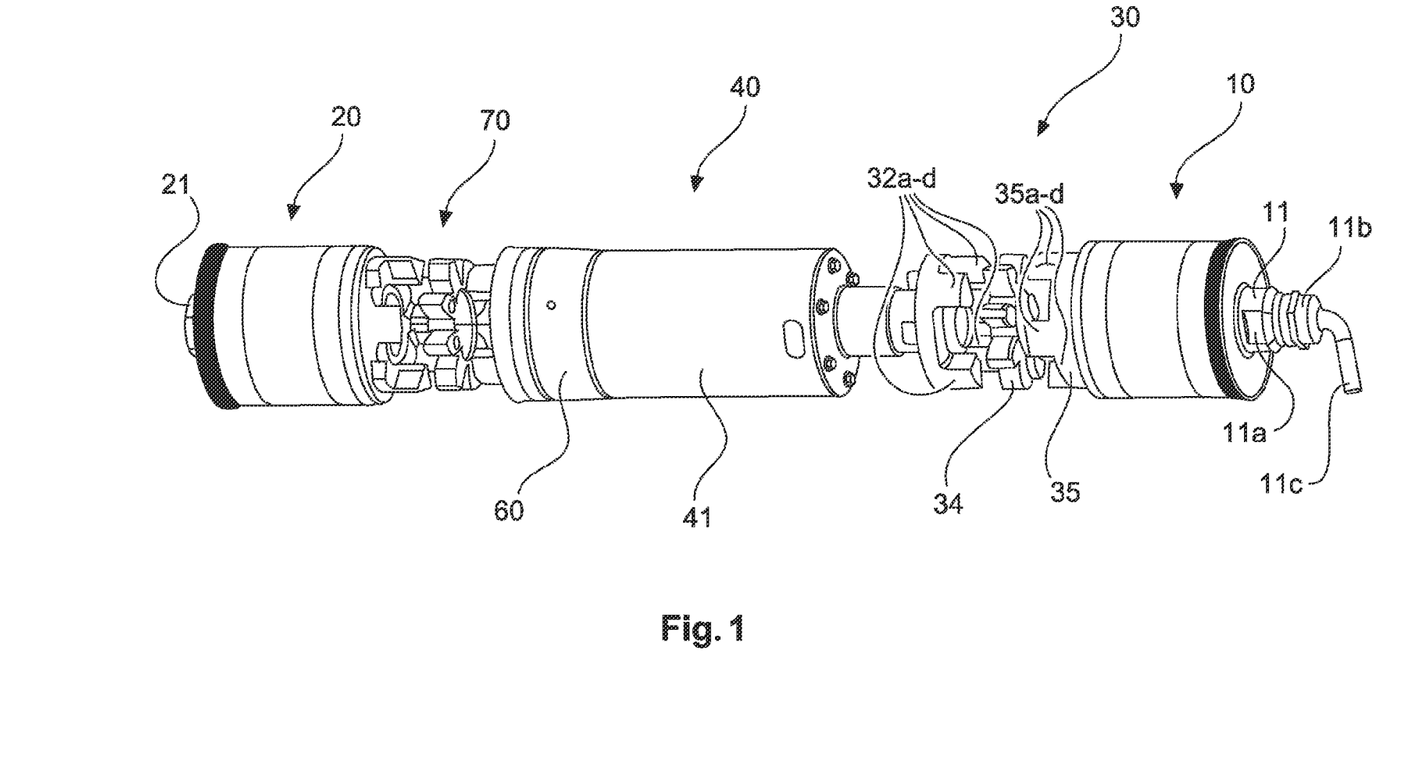
FIG. 1 shows a perspective, partly exploded view of a first embodiment of the conveyor according to the invention.
Figure 2:
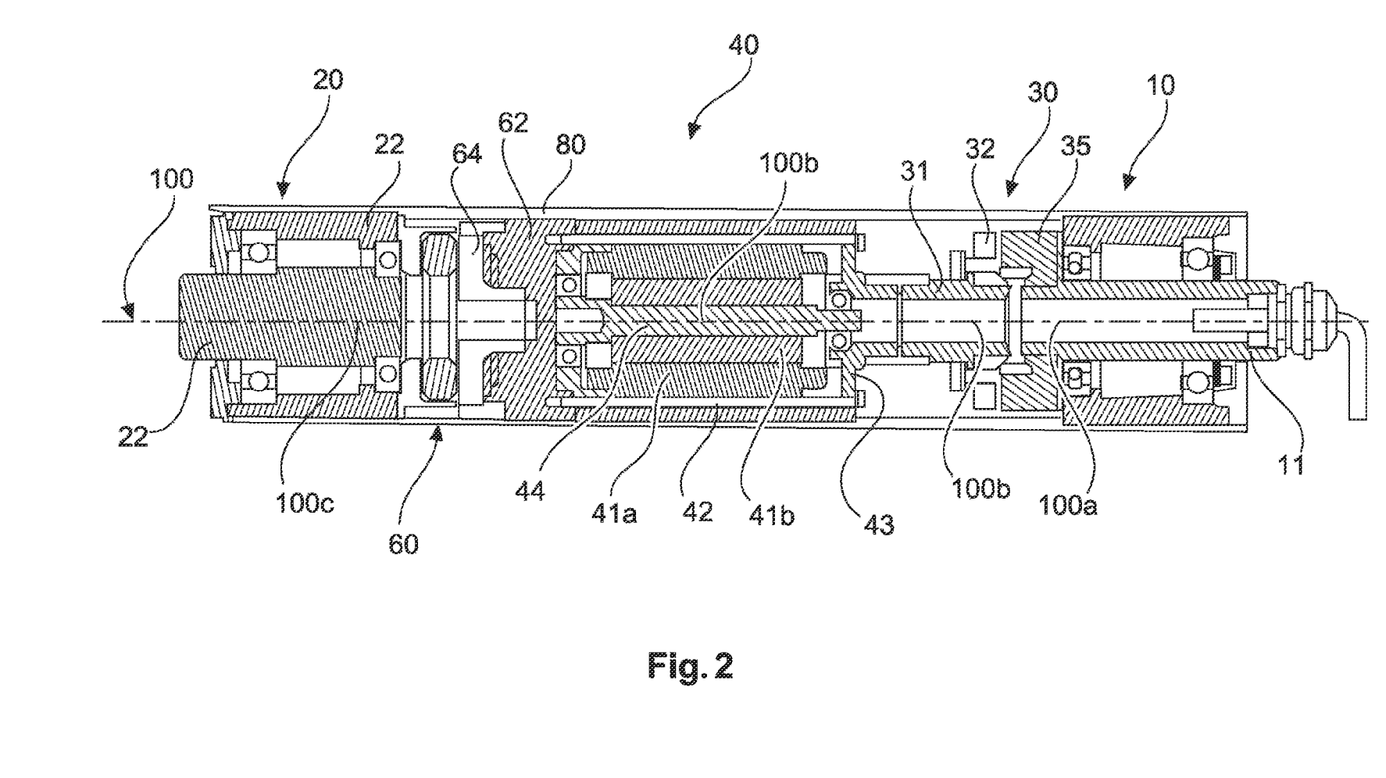
FIG. 2 shows a longitudinal cross-sectional view of the embodiment according to FIG. 1.

Referring firstly to FIGS. 1 and 2, a conveyor according to the invention, in the embodiment as a drum motor, has a first bearing unit 10 at one end and a second bearing unit 20 at the opposite end. The two end bearing units 10 and 20 are used to receive a drum body 80, which is essentially a cylindrical pipe (not shown in FIG. 1) and to mount it rotatably about a longitudinal axis 100.

A first stub shaft 11 in the form of a hollow axle projects outward through the end of the drum motor from first bearing unit 10 at the one end. Hollow stub shaft 11 has planar surfaces 11a like wrench flats, which in combination with fixing means in the form of a screw nut 11b allow stub shaft 11 to be fixed torque-resistantly in a frame. A cable feed pipe 11c is guided through the hollow space in stub shaft 11 and is used to supply power to the drum motor and to control the drum motor. At the opposite end, a stub shaft 21 extends outward in similar manner through the end face and likewise has fixing means for fixing the second stub shaft 21 torque-resistantly in a frame. This second stub shaft 21 is not designed as a hollow axle, because there is no need for a feed pipe to be guided through said stub shaft.

Feed pipe 11c extends through hollow stub shaft 11, through a first coupling unit 30 to a drive unit 40. Drive unit 40 comprises an electric motor 41 that includes a stator 41a and which is torque-resistantly fixed in a motor housing 42. Stator 41a surrounds a rotor 41b which is rotatably mounted inside motor housing 42. Electric motor 41, including stator 41a and rotor 41b, is embodied as a brushless asynchronous motor. However, motor 41 could also be embodied as a synchronous motor, as a brush-commutated motor, or any other form of electric motor.

Facing the first end bearing unit 10, motor housing 42 has a front cover plate 43, in which a ball bearing for supporting the rotor is disposed. Bearing cap 43 is coupled torque-resistantly with axle element 31, which extends from bearing cap 43 in the direction of the first end bearing unit 10. Axle element 31 is connected by a plurality of screws with a first coupling support 32. The first coupling support 32 has four sector portions 32a-d of triangular cross-section which project in the axial direction toward the first end bearing unit 10 and which taper radially inwards.

Four identically shaped sector portions 35a-d of a second coupling support member 35 engage with the spaces between the four sector portions 32a-d. A gap space is produced as a result between sector portions 32a-d and 35a-d, said gap space comprising a total of eight gaps between the respective four sector portions. A star-shaped rubber element 54 having eight sectors projecting radially outwards from a central ring is disposed in coupling 30 in such a way that it fills the spaces between the respective four sector portions 32a-d and 35a-d. This produces substantially rigid transmission of a torque about longitudinal axis 100 from the second coupling support via rubber element 34 to the first coupling support, or vice versa. In contrast thereto, coupling 30 is able on account of this geometry to not apply a counter-force when bending moments occur transversely to the longitudinal axis, but to allow an angular deviation between a longitudinal axis portion 100a, around which the second coupling support is arranged rotationally symmetrically, and longitudinal axis portion 100b, around which the first coupling support element extends rotationally symmetrically.

The second coupling support 35 is coupled torque-resistantly with the first stub shaft 11. The assembly comprising the first stub shaft 11, coupling 30 with axle element 31, and motor cover plate 43 thus provides torque stabilization for motor housing 42 and for stator 41a anchored torque-resistantly therein.

Rotor 41b is arranged around a motor output shaft 44 which is set in rotary motion relative to motor housing 41 by the electromagnetic forces between the stator and the rotor. Motor output shaft 44 is coupled with a gear input shaft 64 of a planetary gear 60. The planetary gear wheels of said planetary gear are coupled via their planetary gear carriers with a gear output shaft of planetary gear 60. As variants of the planetary gear principle, it is also possible as a basic principle to use other forms of gear, such as spur gears, and other transmission setups with input or output via sun wheel, planetary wheels or internal gear.

The gear input and gear output shaft and the gear output shaft are rotatably mounted in a gear casing 61. Gear casing 62 is connected torque-resistantly with motor housing 42 and in combination with said motor housing forms the outer casing of the drive unit.

Gear output shaft 64 is coupled with a second flexible elastic coupling 70 which couples the gear output shaft with a connector member 22 of the second end bearing unit 20. Like the first flexible elastic coupling 50, the second flexible elastic coupling 30 has a first coupling unit and a second coupling unit, each having projecting sector portions, and a star-shaped rubber element for transmitting force by a form fit between said sector portions, and is functionally identical in construction to the first flexible elastic coupling 30. The second flexible elastic coupling 70 is bolted torque-resistantly to connector member 22 by means of the coupling unit facing the second end bearing unit 20 and in that manner transfers the rotational movement of the rotor to connector member 22. Connector member 22 is torque-resistantly connected with the drum body and therefore drives the drum body with the rotational movement of the rotor. Connector member 22 is rotatably mounted on the second stub shaft 21 by means of two ball bearings, thus allowing rotary motion about the longitudinal axis 100 for connector member 22 and the drum body connected torque-resistantly thereto.

The functional principle of the drum motor illustrated in FIGS. 1 and 2 is thus that drum body 80 is rotatably mounted on stub shafts 11, 21 by means of the first and second bearing units 10, 20. Stub shaft 11 is connected torque-resistantly with the stator of electric motor 40 by means of coupling 30, said stator being fixed inside the motor housing. Angular deviations of the drive axle or of portion 100b of the longitudinal axis in the region of the drive unit relative to portion 100a of the longitudinal axis in the region of the first bearing unit 10 are allowed by coupling 30 and do not cause any bending forces to act on drive unit 40. The rotor of drive motor 40 is coupled torque-resistantly via gear mechanism 60 and coupling 70 with connector member 22 and thus with drum body 80. The torque produced in the electric motor between the stator and the rotor can therefore be transmitted to drum body 80, with support provided via stub shaft 11. Angular deviations of drive axle 100b relative to axle portion 100c of the longitudinal axis extending in the region of the second bearing unit 20 may be allowed by coupling 70 and do not cause any bending forces to act on drive unit 40 from the gear side. Due to this decoupling of the middle portion 100b of the longitudinal axis on both sides by couplings 30 and 70 from any angular deviations of the portions 100a, c of the longitudinal axis, the drum motor is insensitive to bending that may arise due to radial forces acting on the drum motor and can be operated with low noise emission even when such strong radial forces are acting on it.

Figure 3:
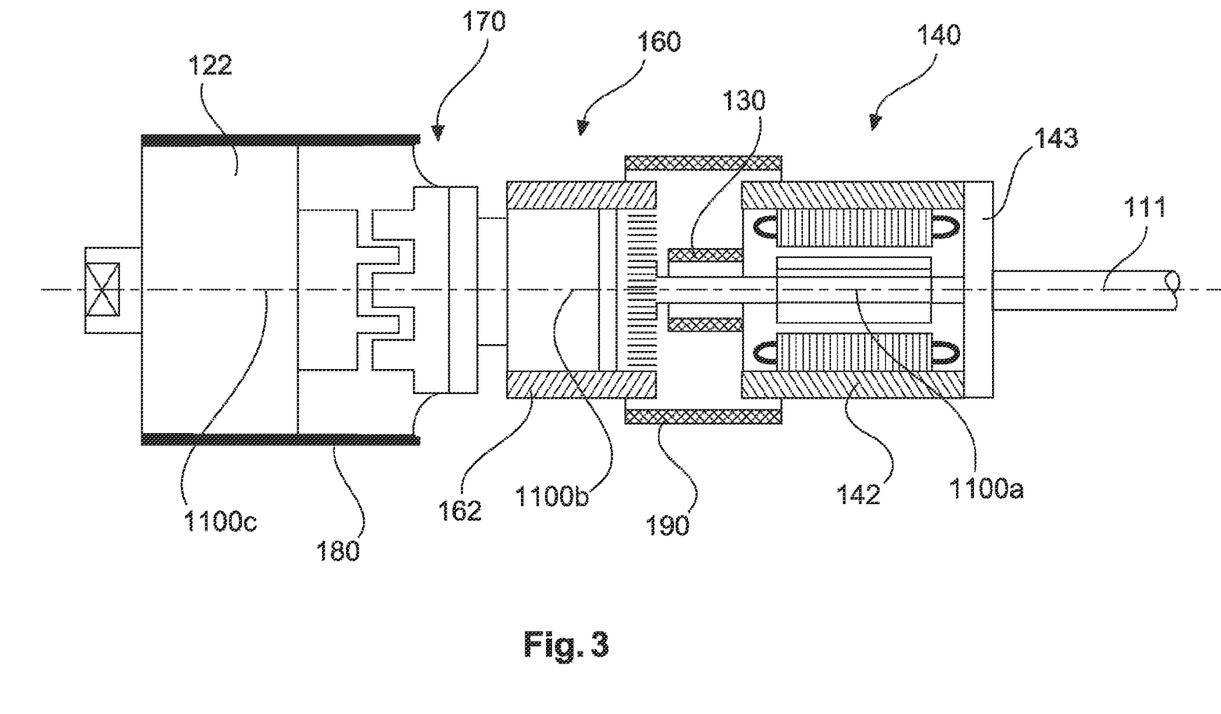
FIG. 3 shows a schematic, longitudinal cross-sectional view of a second embodiment of the conveyor according to the invention.

FIG. 3 shows a second embodiment of the conveyor according to the invention in a schematic longitudinal cross-sectional view. What is shown is just a part of the conveyor; the drum body and the first end bearing unit with the stub shaft section disposed therein are not shown in FIG. 3.

In the embodiment in FIG. 3, the first end stub shaft 111 is coupled directly with housing cover 143 of drive motor 140; a separate coupling unit is not provided for this coupling. The torque support provided in this manner for the stator is therefore coupled in a flexurally rigid manner with the first bearing unit (not shown).

The rotor of drive motor 140 is coupled by means of a first flexible elastic coupling 130 with a gear input shaft of a gear mechanism 160. Analogously with the first embodiment as shown in FIGS. 1 and 2, the gear output shaft is coupled via a second flexible elastic coupling 170 with a connector element 122 and is thus coupled torque-resistantly with drum body 180.

In the embodiment shown in FIG. 3, a third flexible elastic coupling 190 is disposed between motor housing 142 and gearbox casing 162 and connects the motor housing with the gearbox casing. This produces torque support about the drive axle and the longitudinal axis for the motor housing and the gearbox casing in relation to each other, but allows angular deviation between the portion of the drive axle inside the drive motor and the portion of the drive axle inside the gear mechanism. In this way, gear mechanism 160 is fully decoupled from drive motor 140 by the third flexible elastic coupling 190 and the first flexible elastic coupling 130 such that, even though the rotational motion is transferred torsionally stiffly from the rotor to the gear input shaft, with support provided by the stator in the motor housing and by the gear casing, the two couplings 130, 190 still allow bending to occur transversely to the longitudinal axis between longitudinal axis 1100a in the region of the drive motor and the region of longitudinal axis 1100b inside the gear mechanism, without strong bending forces acting as a result on the gear mechanism or the drive motor. Due to its being disposed between couplings 150, 190 and 170, gear mechanism 160 is therefore decoupled not only in the direction of the drive motor and the first end bearing unit, but also in the direction of the second end bearing unit against bending forces acting transversally to the longitudinal axis, so any such bending forces cannot act transversally on the gear mechanism, thus allowing low-noise operation of the gear mechanism even when strong radial forces are acting on the drum motor.

The invention claimed is:

1. A conveyor comprising:
   an axle extending along a longitudinal axis,
   a drum body mounted rotatably about the longitudinal axis on the axle,
   a drive unit comprising an electrical drive motor which is disposed inside the drum body and which includes a rotor and a stator, wherein either one of the rotor or the stator is coupled torque-resistantly with a drive output shaft which is mounted rotatably about a drive axle and the other one of said rotor and stator is a torque support and is coupled torque-resistantly with the axle,
   a connector member which is disposed inside the drum body and torque-resistantly coupled with the drum body and the drive output shaft of the drive motor,
   wherein a first flexible elastic coupling is disposed between the torque support and the axle, and that a second flexible elastic coupling is disposed between the drive output shaft and the drum body.

2. The conveyor according to claim 1, wherein the first flexible elastic coupling is adapted to perform an elastic angular offset about a transverse axis perpendicular to the drive axle when impinged with a torque about the transverse axis, said angular offset being greater than an angular offset about the drive axle when the same torque is applied to the drive axle.

3. The conveyor according to claim 1, wherein the second flexible elastic coupling is adapted to perform an elastic angular offset about a transverse axis perpendicular to the drive axle when impinged with a torque about the transverse axis, said angular offset being greater than an angular offset about the drive axle when the same torque is applied to the drive axle.

4. The conveyor according to claim 1, wherein
   the drive unit includes a gear mechanism which has a gear output shaft,
   the drive motor has a motor output shaft coupled with a gear input shaft and
   the gear output shaft is coupled with the connector member.

5. The conveyor according to claim 4, wherein the second flexible elastic coupling is coupled between the gear output shaft and the connector member.

6. The conveyor according to claim 4, wherein the second flexible elastic coupling is coupled between the motor output shaft and the gear input shaft.

7. The conveyor according to claim 6, wherein the gear mechanism has a gear casing in which the gear input shaft is rotatably mounted, and that the gear casing is connected torque-resistantly by means of a third flexible elastic coupling with a motor housing of the drive motor.

8. The conveyor according to claim 7, wherein the first, second and/or third flexible elastic coupling has a rubber element for transmitting torque about the drive axle.

9. The conveyor according to claim 8, wherein the rubber element is coupled form-fittingly for torque transmission with a coupling input support and a coupling output support.

10. The conveyor according to claim 8, wherein the rubber element has a plurality of sectors distributed over a circumference of the coupling, said sectors each having a first contact surface oriented perpendicularly to the circumferential direction and a second contact surface oriented perpendicularly to the circumferential direction, and that the first contact surface abuts against a corresponding surface of the coupling input support and the second contact surface abuts against a corresponding surface of the coupling output support.

11. The conveyor according to claim 8, wherein the sectors of the rubber element are joined together to form an integral rubber element.

12. The conveyor according to claim 1, wherein the axle includes a first stub shaft which projects from the drum body at a first end face of the drum body and on which the drum body is mounted rotatably about a first portion of the longitudinal axis, and includes a second stub shaft which projects from the drum body at an opposite end face of the drum body from the first end face and on which the drum body is mounted rotatably about a second portion of the longitudinal axis, and that the first flexible elastic coupling is disposed between the torque support and the first stub shaft and that the second flexible elastic coupling is disposed between the drive output shaft and the drum body.

13. The conveyor according to claim 12, wherein the first flexible elastic coupling is spatially arranged in the region between the drive unit and the first stub shaft, and the second flexible elastic coupling is spatially arranged in the region between the drive unit and the second stub shaft.

14. The conveyor according to claim 12, wherein the first and the second stub shafts run coaxially with each other when there is no radial load on the drum body and run at an obtuse angle to each other when the drum body is under a radial load, and that the angular offset formed by the obtuse angle is taken up by the first and second flexible elastic coupling such that the bending moment exerted by the radial load on the drive unit is less than the bending moment exerted by the radial load on the drum body.

15. The conveyor according to claim 1, comprising a second drum body which is spaced apart from the drum body and mounted rotatably on a second axle, a continuous conveyor belt arranged around the drum body and the second drum body, and a tensioning device for tensioning the continuous conveyor belt.

* * * * *